(12) United States Patent
Ishidoshiro (10) Patent No.: US 7,366,158 B2
(45) Date of Patent: Apr. 29, 2008

(54) CONNECTION DEVICE PROVIDING ACCESS POINT TO WIDE AREA NETWORK

(75) Inventor: Takashi Ishidoshiro, Nagoya (JP)

(73) Assignee: Buffalo Inc., Nagoya (JP)

( * ) Notice: Subject to any disclaimer, the term of this patent is extended or adjusted under 35 U.S.C. 154(b) by 1238 days.

(21) Appl. No.: 10/269,824

(22) Filed: Oct. 11, 2002

(65) Prior Publication Data
US 2004/0066776 A1 Apr. 8, 2004

(30) Foreign Application Priority Data
Oct. 8, 2002 (JP) ............................. 2002-295135

(51) Int. Cl.
*H04M 1/64* (2006.01)
(52) U.S. Cl. ..................................... 370/352; 379/76
(58) Field of Classification Search ........ 370/352–356; 379/76, 88.17
See application file for complete search history.

(56) References Cited

U.S. PATENT DOCUMENTS 6,314,094 B1 11/2001 Boys
6,876,728 B2 * 4/2005 Kredo et al. ............. 379/88.17

FOREIGN PATENT DOCUMENTS

| EP | 0797368 A2 | 9/1997 |
|---|---|---|
| EP | 1011278 A2 | 6/2000 |
| JP | 10-93499 | 4/1998 |
| JP | 2000-175250 | 6/2000 |
| JP | 2002-125069 | 4/2002 |
| JP | 2002-290567 | 10/2002 |
| JP | 2003-348253 | 12/2003 |
| WO | WO00/62518 | 10/2000 |

OTHER PUBLICATIONS

Japanese Office Action dated Mar. 15, 2005 from corresponding Japanese Application No. 2002-295135 (English translation enclosed).
Furht, et al., "A New Approach for Radio and Video Broadcasting Over the Internet," 1999, IEEE.

* cited by examiner

*Primary Examiner*—Suhan Ni
(74) *Attorney, Agent, or Firm*—Beyer Law Group LLP (57) ABSTRACT

The IP telephony system of the present invention attains addition of advertisement information to an IP telephone set without any specific server for processing all communication information. A wireless LAN base station 10a provides an access point used for connecting a radio IP telephone set 20a to the Internet 30. An announcement information storage module 150 stores advertisement data, which is reproducible by the radio IP telephone set 20a. The IP telephony system utilizes a protocol provided by the Internet 30 and attains communication of audio information between the radio IP telephone set 20a and another device connected thereto via the Internet 30. At a preset timing in the course of communication of the audio information, the advertisement data stored in the announcement information storage module 150 is transmitted to the radio IP telephone set 20a.

10 Claims, 10 Drawing Sheets

| TELEPHONE NUMBER | IP ADDRESS | MAC ADDRESS | BASE STATION ID |
|---|---|---|---|
| 112233 | XYZ.123.1.2 | 12:34:56:78:9A:BC | AP1 |
| 223344 | XYZ.123.1.5 | 23:45:67:89:AB:CD | AP1 |
| 334455 | XYZ.123.2.7 | 45:67:89:AB:CD:EF | AP2 |
| ... | ... | ... | ... |

CONNECTION DEVICE PROVIDING ACCESS POINT TO WIDE AREA NETWORK

BACKGROUND OF THE INVENTION

1. Field of the Invention

The present invention relates to a technique of transmitting audio information via a wide area network.

2. Description of the Related Art

The Internet telephony (IP telephony) by the VoIP (Voice over IP) technique has been used to establish voice communication on the Internet and other IP (Internet Protocol) networks. The VoIP technique receives and transmits audio information converted into IP packets via the IP network to establish voice communication. Standardization of H.323 as the protocol of the VOIP technique enhances the interconnection of the Internet and the telephone line. The IP telephony has gradually been spread through replacement of internal lines and exclusive lines in a diversity of enterprises and organizations.

The IP telephony requires the baud rate of about 20 kbps for communication of audio information, and applies greater loading to the communication line, compared with the general data communication. The communication line of the lower baud rate causes deterioration of the telephone speech quality. The IP telephony uses a gatekeeper to register the addresses of terminals as communication targets, except in the case of directly inputting each IP address to specify and call a desired communication target. The IP telephony also uses a gateway to establish connection of the IP telephony line with the subscriber phone line. Namely the communication line ensuring the sufficient telephone speech quality and the additional equipment including the gatekeeper and the gateway are essential for the enhanced convenience of the IP telephony. The IP telephony accordingly has additional expenses apart from the general connection fees for the service provider to the Internet. The users of the IP telephony are requested to pay for such expenses.

An IP telephony system utilizing the IP network is disclosed in, for example, PATENT LAID-OPEN GAZETTE No. 2002-125069.

The high total communication expenses due to the additional cost and the difficulty in construction of the good charge system interfere with the further spread of the IP telephony. One available measure uses advertisement to attain the low-cost or free telephone service. But no effective techniques have been proposed so far with regard to addition of the advertisement to the IP telephony system. Because of the characteristics of the IP telephony, addition of the advertisement requires all the data in the IP telephony system to pass through a specific server used for addition of advertisement information. This is against the fundamental advantages of the Internet. The construction of making all the data pass through the specific server applies extremely heavy loading to the server and causes congestion of the line.

SUMMARY OF THE INVENTION

The object of the present invention is thus to solve the problems of the prior art technique discussed above and to provide an IP telephony system that ensures addition of announcement information, such as advertisement information, without any specific server for processing all the communication information.

In order to attain at least part of the above and the other related objects, the present invention is directed to a connection device that provides an access point used for connecting a client computer with a wide area network. The connection device includes: an announcement information storage module that stores audio information, which is reproducible by the client computer, as announcement information; an audio information communication mediation module that utilizes a protocol provided by the wide area network and mediates communication of audio information between the client computer and another device connected thereto via the wide area network; and a transmission module that transmits the announcement information stored in the announcement information storage module to the client computer at a preset timing in the process of mediating communication of the audio information between the client computer and the wide area network.

There is a connection method corresponding to this connection device. Namely the present invention is also directed to a method of connecting a client computer with a wide area network via an access point. The connection method includes the steps of: storing audio information, which is reproducible by the client computer, as announcement information in the access point; utilizing a protocol provided by the wide area network and mediating communication of audio information between the client computer and another device connected thereto via the wide area network; and transmitting the stored announcement information to the client computer at a preset timing in the process of mediating communication of the audio information between the client computer and the wide area network.

In the connection device and the corresponding connection method, announcement information (for example, advertisement information or public information) stored in advance in the access point is transmitted to the client computer at a preset timing in the process of mediating communication of the audio information between the client computer and the wide area network according to the protocol provided by the wide area network. This arrangement enables the announcement information stored in advance in the access point to be added to the communication of the audio information. The connection device and the connection method of the present invention do not require any specific server, through which all the data in the communication system pass through, but ensure addition of the announcement information only by storage of the announcement information in the connection device that provides the access point.

There are diverse applications of the connection device of the present invention. For example, the client computer is an IP telephone set that receives and transmits a packet of audio information to attain voice communication. This arrangement ensures addition of the announcement information to the IP telephony. In another example, the client computer is an Internet radio set that receives a packet of audio information and reproduces voice. This arrangement ensures addition of the announcement information to the Internet radio.

In the case of the IP telephone set or the Internet radio set, the audio information communication mediation module transmits the packet to the IP telephone set or to the Internet radio specified by the packet according to the protocol provided by the wide area network.

The preset timing for the transmission of the announcement information may be any one of at a start of the communication of the audio information, at an end of the communication of the audio information, and in the middle of the communication of the audio information. Addition of the announcement information is thus carried out at a best timing of highest possibility that the user of the communication system listens to the announcement information, according to the application of the communication of the audio information.

In one preferable embodiment of the present invention, the connection device further has a management client computer to update the stored announcement information. The management client computer facilitates updating of the announcement information. The announcement information itself maybe stored in the connection device. In another available structure, only indexes (tags) for identifying respective pieces of announcement information are stored in the connection device, and the respective pieces of announcement information themselves are stored in another computer or a hard disk linked with the connection device. In the latter structure, a required piece of the announcement information is readily read out, based on the index. This arrangement does not require a large mass of announcement information to be stored in the connection device having only a limited storage capacity.

The connection device may further include a router module that links a local area network with the wide area network and connects the client computer to the wide area network via the local area network. The router module ensures addition of the announcement information in the communication between a device linked with the wide area network and a device linked with the local area network.

The router module may be constructed to establish connection of at least one of client computers included in the local area network via wireless communication. This arrangement enables the announcement information to be added in the communication of audio information with a portable terminal as the client computer.

The above and other objects, features, aspects, and advantages of the present invention will become more apparent from the following detailed description of the preferred embodiments with the accompanying drawings.

BRIEF DESCRIPTION OF THE DRAWINGS

FIG. 2 is a block diagram showing the internal structure of a wireless LAN base station 10a;

FIG. 3 is a block diagram showing the internal structure of a radio IP telephone set 20a;

FIG. 4 is a block diagram showing the internal structure of a management client computer 60a;

FIG. 7 is a flowchart showing an advertisement transmission process executed by the wireless LAN base station 10a;

FIG. 10 is a flowchart showing a radio advertisement transmission process executed by the wireless LAN base station 10a.

DESCRIPTION OF THE PREFERRED EMBODIMENTS

The following describes a wireless IP telephony system utilizing a connection device, which establishes connection to a wireless local area network (hereafter referred to as wireless LAN) as one of connection devices according to the present invention.

Figure 1:
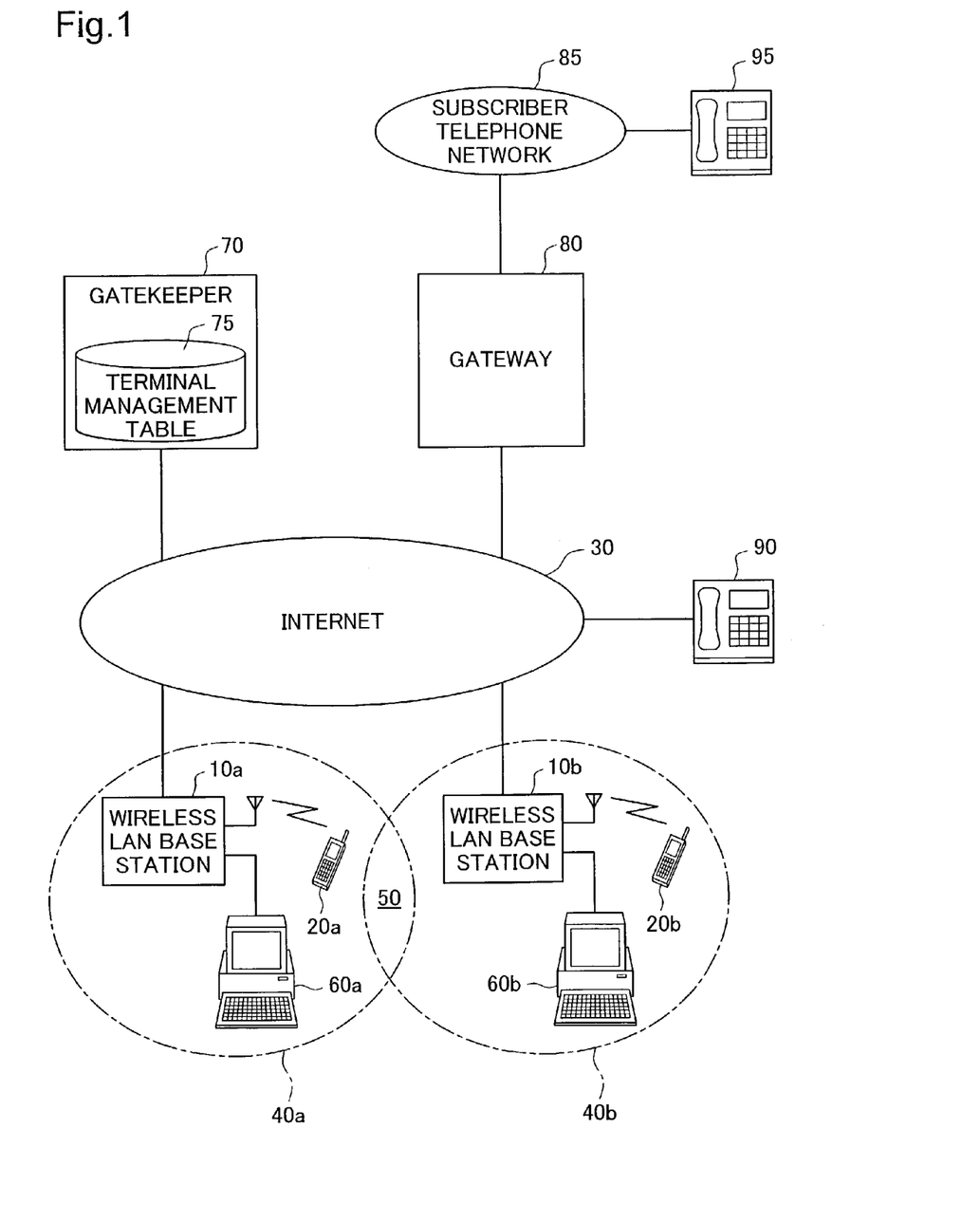
FIG. 1 schematically illustrates the general construction of a wireless IP telephony system in a first embodiment of the present invention.

FIG. 1 schematically illustrates the general construction of a wireless IP telephony system in a first embodiment of the present invention. This wireless IP telephony system transmits audio information via the Internet as a wide area network. In the wireless IP telephony system, wireless LAN base stations 10a and 10b function as connection devices that provide access points, and are connected to the Internet 30 as a wide area network. Radio IP telephone sets 20a and 20b function as client computers and are connected to the access points provided by the wireless LAN base stations 10a and 10b. The wireless LAN base stations 10a and 10b are connected with radio IP telephone sets in respective radio zones 40a and 40b, in which radio waves are transmittable, by known wireless communication. The wireless communication is in conformity with a standard IEEE802.11b for wireless LAN. The radio zones 40a and 40b have a mutual overlap area called a band switchover area 50, which functions to switch over the radio channel (band switchover) between the wireless LAN base stations 10a and 10b. This band switchover technique allows mobile communication of the radio IP telephone sets 20a and 20b between the radio zones 40a and 40b. Management client computers 60a and 60b are connected respectively with the wireless LAN base stations 10a and 10b via local area networks (hereafter referred to as LANs).

In addition to the wireless LAN base stations 10a and 10b, a gatekeeper 70, a gateway 80, and an IP telephone set 90 are also connected to the Internet 30. The gatekeeper 70 is used to register IP telephony terminals, to manage addresses of connection targets, and to give permission for band license applications. The gateway 80 is connected to a subscriber telephone network 85, with which subscriber telephone sets 95 are linked, and establishes communication between the subscriber telephone and the IP telephone through conversion of their protocols. The radio IP telephone sets 20a and 20b and the IP telephone sets 90 receive and transmit packets of audio information to attain voice communication.

Figure 2:
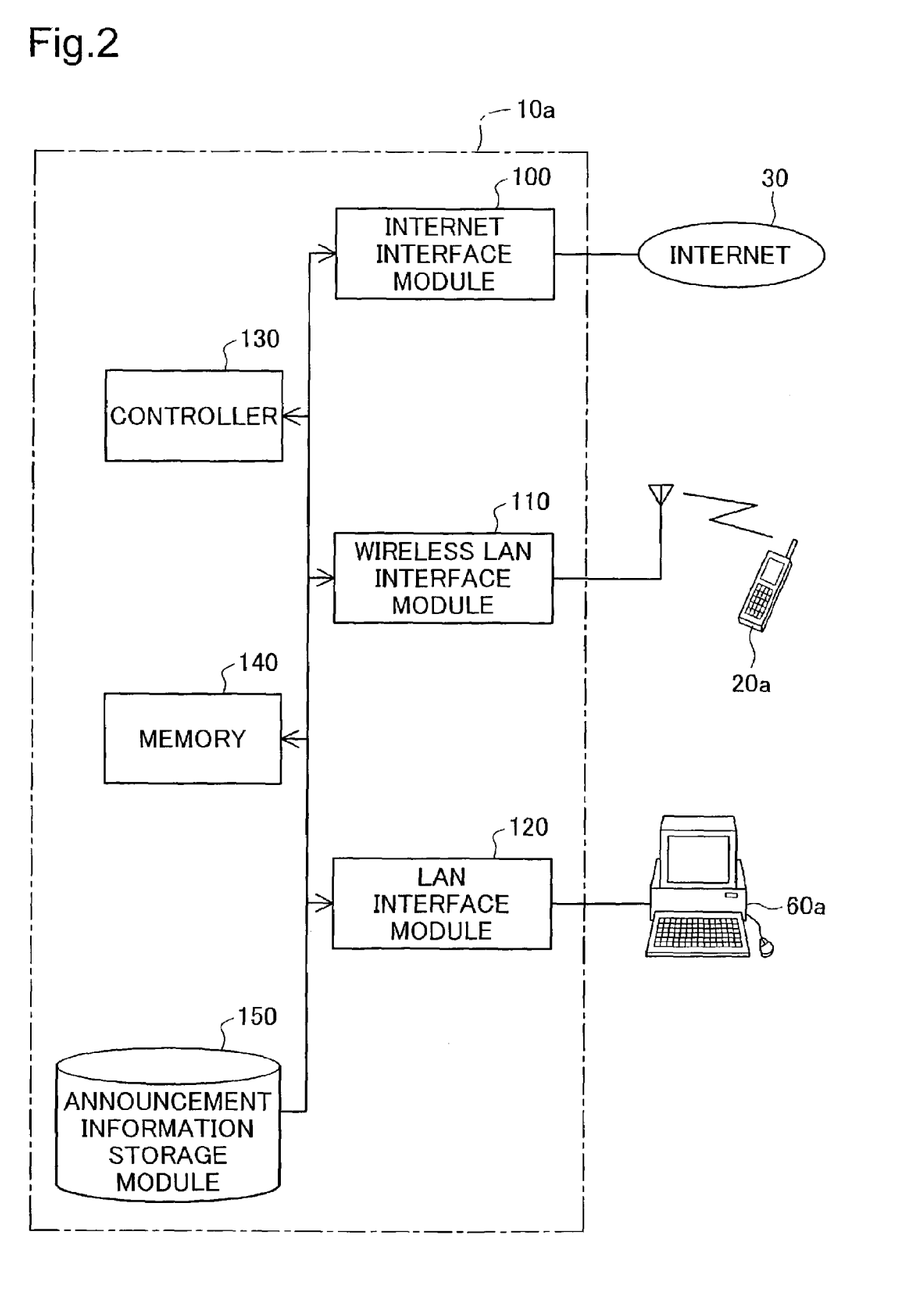

The internal structure of the wireless LAN base stations 10a and 10b is discussed below. FIG. 2 is a block diagram showing the internal structure of the wireless LAN base station 10a. The wireless LAN base station 10a has an Internet interface module 100 functioning as an interface with the Internet 30, a wireless LAN interface module 110 functioning as an interface with a wireless LAN, and a LAN interface module 120 functioning as an interface with a local area network. The wireless LAN base station 10a also includes a controller 130 that processes various pieces of information transmitted from the respective constituents and control these constituents, a memory 140 that temporarily stores information used for various series of processing executed by the controller 130, and an announcement information storage module 150 that stores audio data, which is reproducible by the client computers. The controller 130 has the router function to interconnect the Internet 30 with a wireless LAN or a cabled LAN. The wireless LAN base station 10b has an identical internal structure with that of the wireless LAN base station 10a.

In this embodiment, each wireless LAN base station is capable of handling 16 global IP addresses at most. The global IP addresses are acquired in advance by each wireless LAN base station and are subjected to allocation. The wireless LAN base station uses one IP address by itself and allocates the residual 15 IP addresses to radio IP telephone sets. The number of IP addresses handled by one wireless LAN base station is set in advance according to the upper limit number of client computers acceptable in the radio communicable area.

Figure 3:
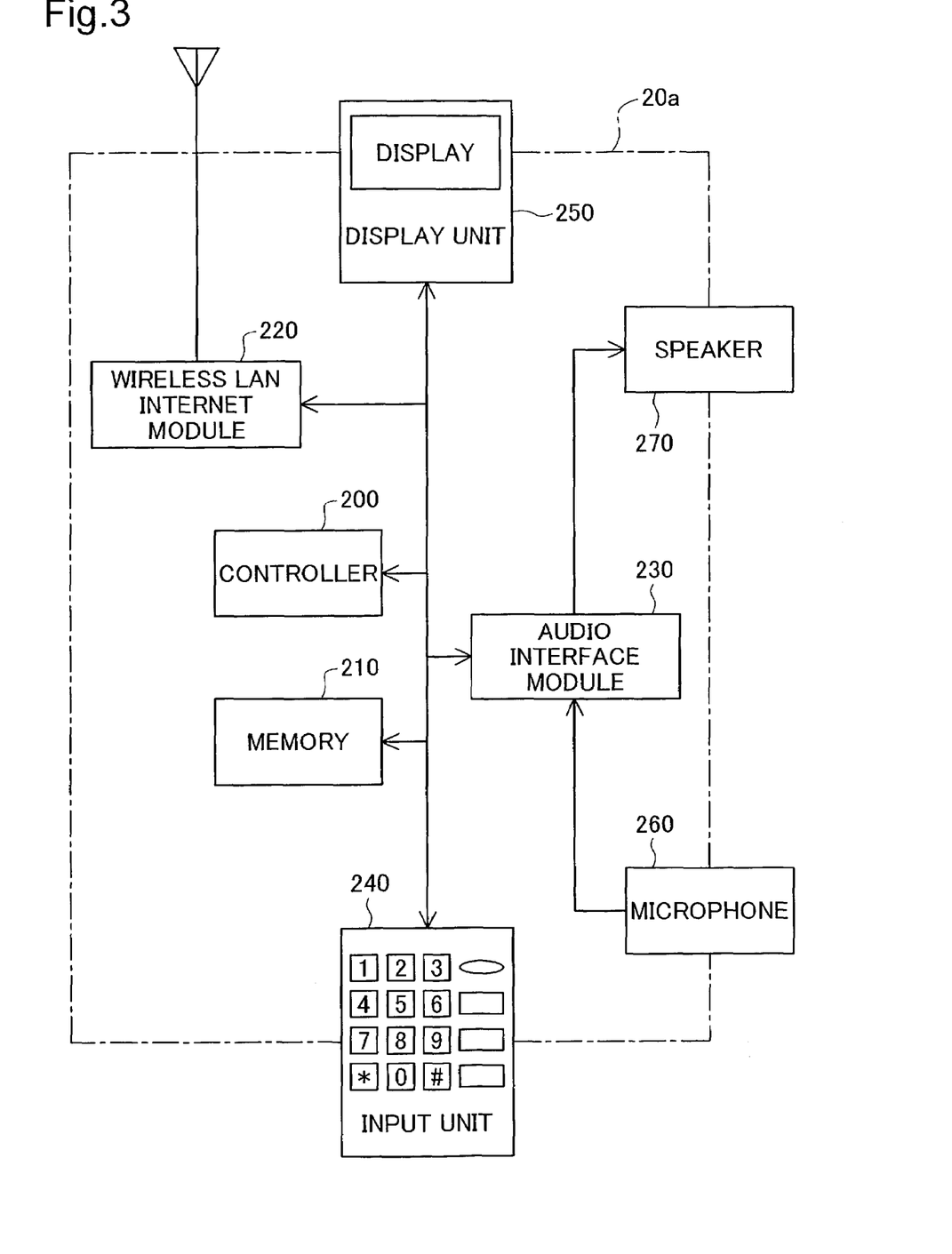

The internal structure of the radio IP telephone sets 20*a* and 20*b* is described here. FIG. 3 is a block diagram showing the internal structure of the radio IP telephone set 20*a*. The radio IP telephone set 20*a* has a controller 200, a memory 210, a wireless LAN interface module 220, an audio interface module 230, an input unit 240, and a display unit 250. The controller 200 processes various pieces of information transmitted from the respective constituents and control these constituents. The memory 210 temporarily stores information used for various series of processing executed by the controller 200. The wireless LAN interface module 220 interfaces inputs and outputs into and from a wireless LAN. The audio interface module 230 is connected with a microphone 260 for audio inputs and a speaker 270 for audio outputs and interfaces the audio inputs and outputs. The input unit 240 detects a user's calling operation. The display unit 250 causes diverse pieces of information to be displayed on, for example, a liquid crystal display. The radio IP telephone set 20*b* has an identical internal structure with that of the radio IP telephone set 20*a*.

Figure 4:
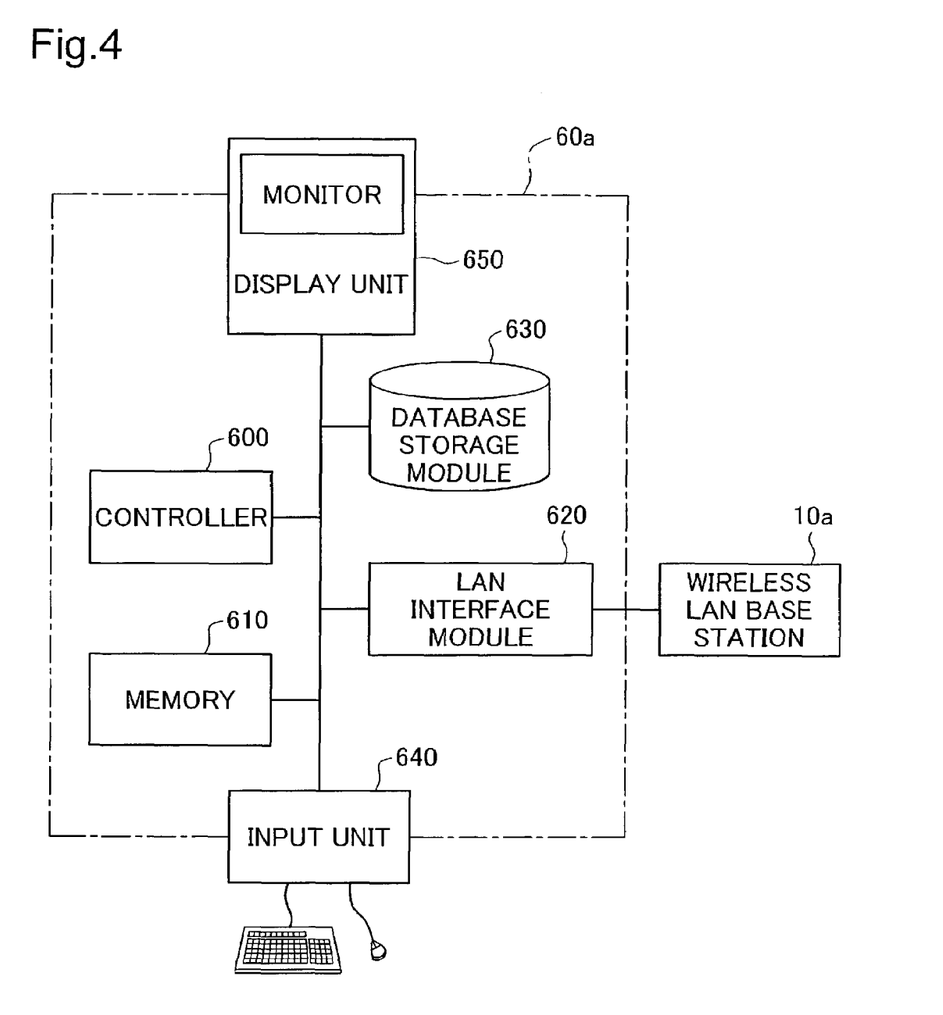

The internal structure of the management client computers 60*a* and 60*b* is described here. FIG. 4 is a block diagram showing the internal structure of the management client computer 60*a*. The management client computer 60*a* has a controller 600, a memory 610, a LAN interface module 620, a database storage module 630, an input unit 640, such as a keyboard and a mouse, and a display unit 650, such as a monitor. The controller 600 processes various pieces of information transmitted from the respective constituents and control these constituents. The memory 610 temporarily stores information used for various series of processing executed by the controller 600. The LAN interface module 620 transmits information to and from the wireless LAN base station 10*a* via a LAN. The database storage module 630 keeps the audio data, which are to be stored in the announcement information storage module 150 of the wireless LAN base station 10*a*, in the form of a database. The management client computer 60*b* has an identical internal structure with that of the management client computer 60*a*.

Figure 5:
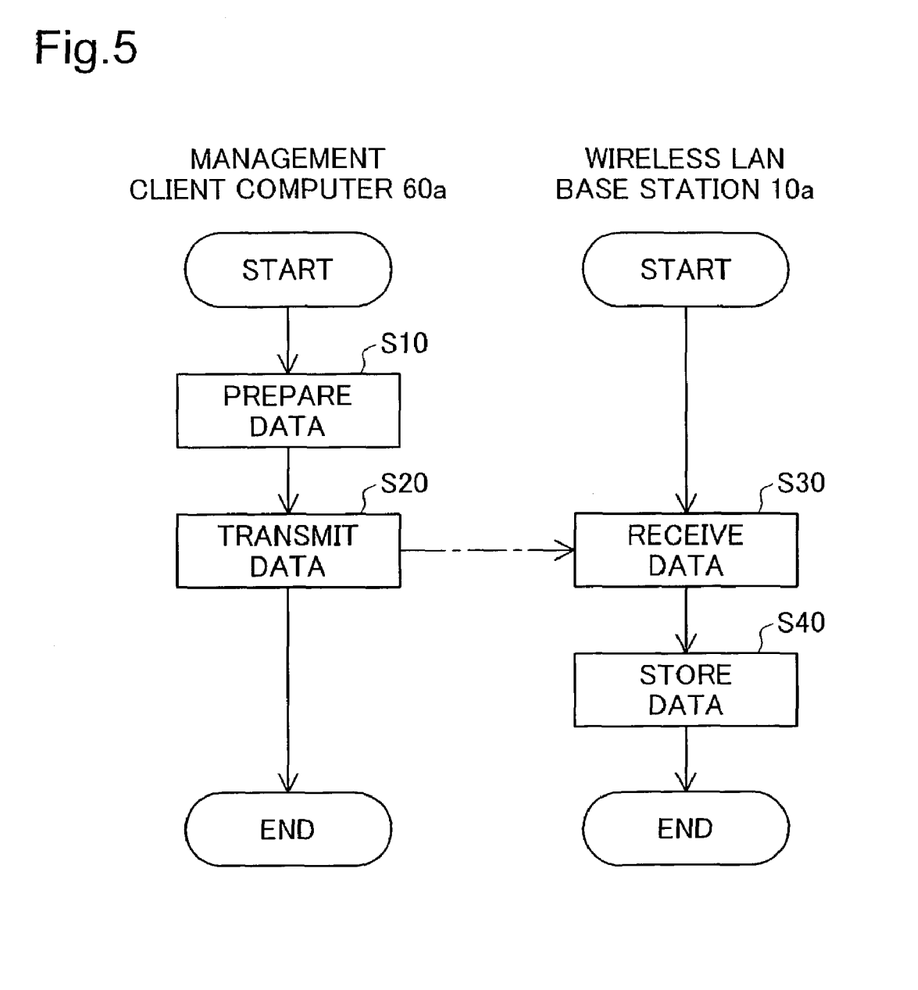
FIG. 5 is a flowchart showing a data storage process.

The management client computer 60*a* stores advertisement data, which is audio advertisement information, into the announcement information storage module 150 of the wireless LAN base station 10*a* according to a data storage process discussed below. The advertisement data is audio information obtained by converting analog audio data into a form of digital data to allow transmission between digital devices, and is reproducible by the radio IP telephone set. FIG. 5 is a flowchart showing the data storage process. The right side shows a series of processing executed by the wireless LAN base station 10*a*, and the left side shows a series of processing executed by the management client computer 60*a*. The management client computer 60*a* first converts analog audio data into digital audio data or reads digital audio data from a recording medium or a network and sets the digital audio data as advertisement data in the memory 610 (step S10). The management client computer 60*a* subsequently transmits the prepared advertisement data to the wireless LAN base station 10*a* via the LAN (step S20).

The wireless LAN base station 10*a* receives the transmitted advertisement data (step S30) and stores the received advertisement data with the date of storage into the announcement information storage module 150 (step S40). The management client computer 60*b* carries out the same series of data storage process to the wireless LAN base station 10*b*.

The registration of the radio IP telephone set 20*a* into the gatekeeper 70 is discussed below. The radio IP telephone set 20*a* entering the radio zone 40*a* to be communicable with the wireless LAN base station 10*a* transmits a linkage request to the wireless LAN base station 10*a*. In response to input of the linkage request, the wireless LAN base station 10*a* transmits a notice of linkage acceptance to the radio IP telephone set 20*a* and allocates an IP address to the radio IP telephone set 20*a*. The wireless LAN base station 10*a* is capable of connecting with 15 radio IP telephones at most, as mentioned previously. When a $16^{th}$ radio IP telephone set transmits a linkage request, no notice of linkage acceptance is issued to the request. The radio IP telephone set 20*a* then notifies the wireless LAN base station 10*a* of a terminal ID. The terminal ID is an identifier for identifying each terminal and includes, for example, an IP address, a MAC (Media Access Control) address, and a telephone number originally allocated thereto. The wireless LAN base station 10*a* receives the terminal ID and sends the terminal ID and a base station ID, which is an identifier for identifying the base station, to the gatekeeper 70.

Figure 6:
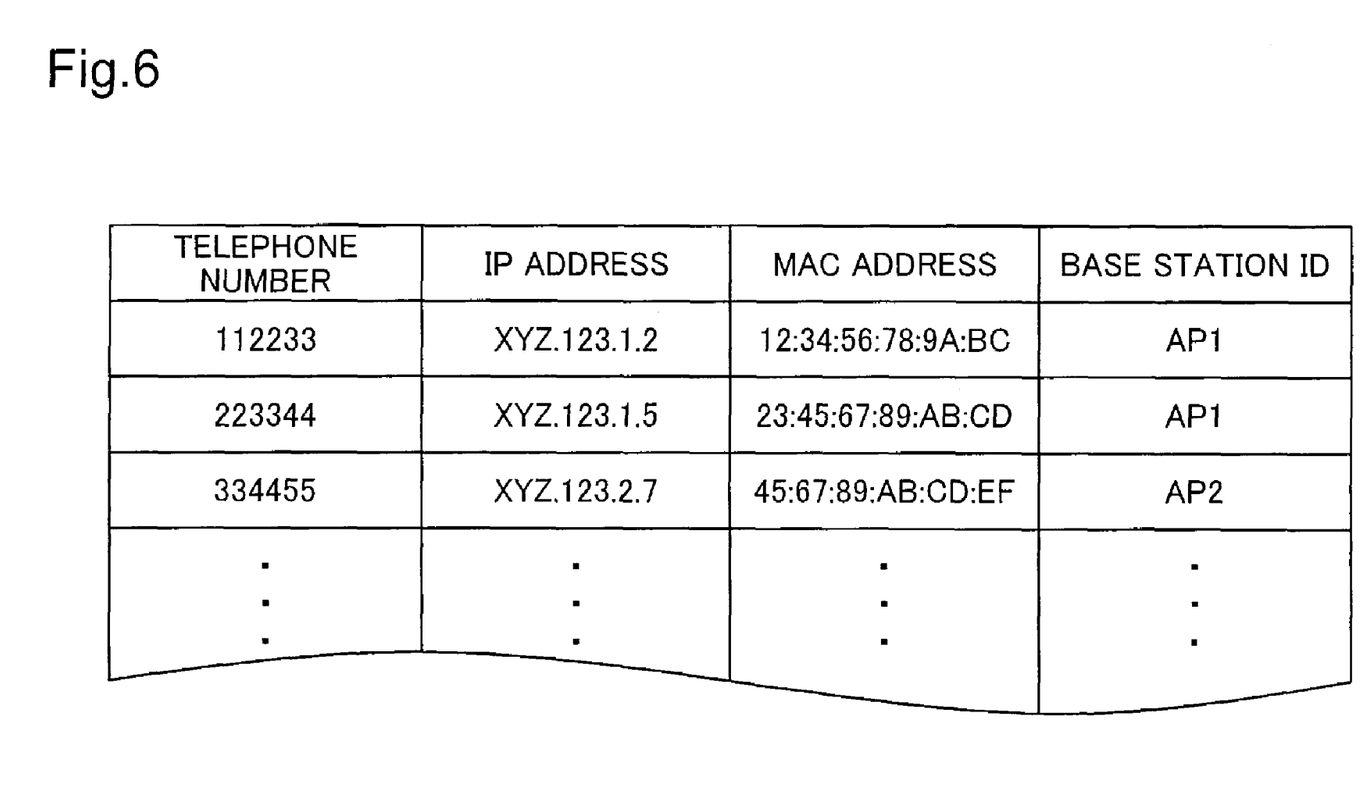
FIG. 6 shows the contents of a terminal management table 75 as an example.

The gatekeeper 70 receives the terminal ID and the base station ID and registers the input terminal ID and base station ID into a terminal management table 75 built in the gatekeeper 70. FIG. 6 shows the contents of the terminal management table 75 as an example. The terminal management table 75 has the registration of a mapping of the telephone number, the IP address, the MAC address as the terminal ID to the base station ID. The registration is not stationary. When the radio IP telephone set 20*a* is moved from the radio zone 40*a* of the wireless LAN base station 10*a* to the radio zone 140*b* of the wireless LAN base station 10*b*, the IP address and the base station ID registered in the terminal management table 75 are updated. The registration is carried out at preset timings, for example, at predetermined time intervals. The radio IP telephone set 20*b* is also subjected to this registration process when entering the radio zone.

Voice communication is established in the following manner, in response to a call from the radio IP telephone set 20*a* to the radio IP telephone set 20*b*. When the user inputs the telephone number of the radio IP telephone set 20*b* as a connection target on the input unit 240 of the radio IP telephone set 20*a*, the radio IP telephone set 20*a* transmits the input telephone number to the gatekeeper 70 via the wireless LAN base station 10*a*. The gatekeeper 70 refers to the terminal management table 75 and transmits the IP address of the radio IP telephone set 20*b* mapped to the transmitted telephone number to the radio IP telephone set 20*a* via the wireless LAN base station 10*a*. The radio IP telephone set 20*a* receives the IP address and establishes connection with the radio IP telephone set 20*b* via the wireless LAN base station 10*a* based on the received IP address.

After establishment of connection between the radio IP telephone set 20*a* and the radio IP telephone set 20*b*, the radio IP telephone set 20*a* transmits a calling signal to the radio IP telephone set 20*b*. The radio IP telephone set 20*b* receives the calling signal and transmits a called signal to the radio IP telephone set 20*a*. In response to a receiver lifting operation of the radio IP telephone set 20*b,* the radio IP telephone set 20*b* transmits a reply signal to the radio IP telephone set 20*a*. When the radio IP telephone set 20*a* receives the reply signal, connection between the radio IP telephone set 20*a* and the radio IP telephone set 20*b* is established for voice communication. Voice communication or data communication continues until a hang up of either of the radio IP telephone sets 20*a* and 20*b*.

Figure 7:
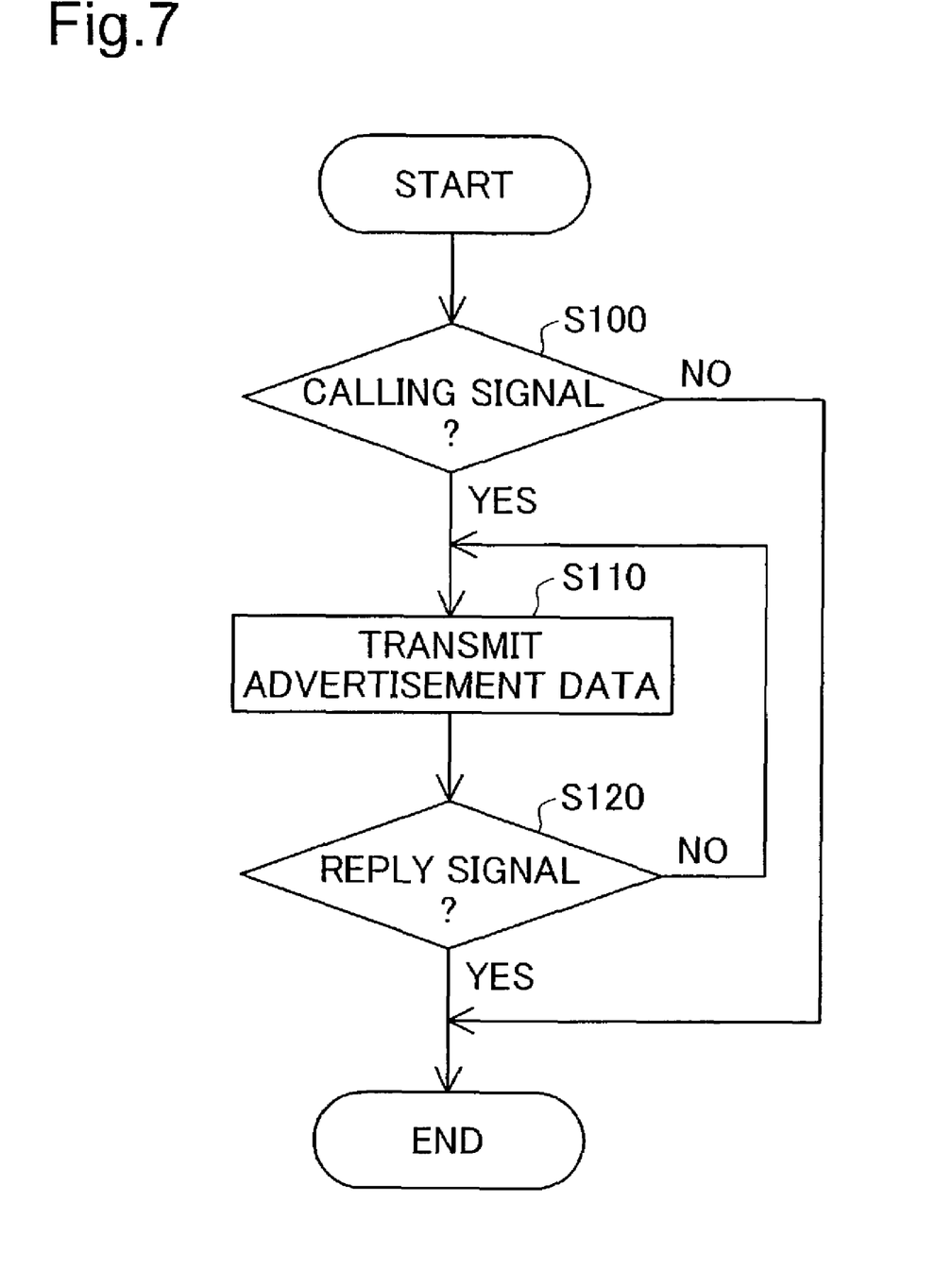
Figure 8:
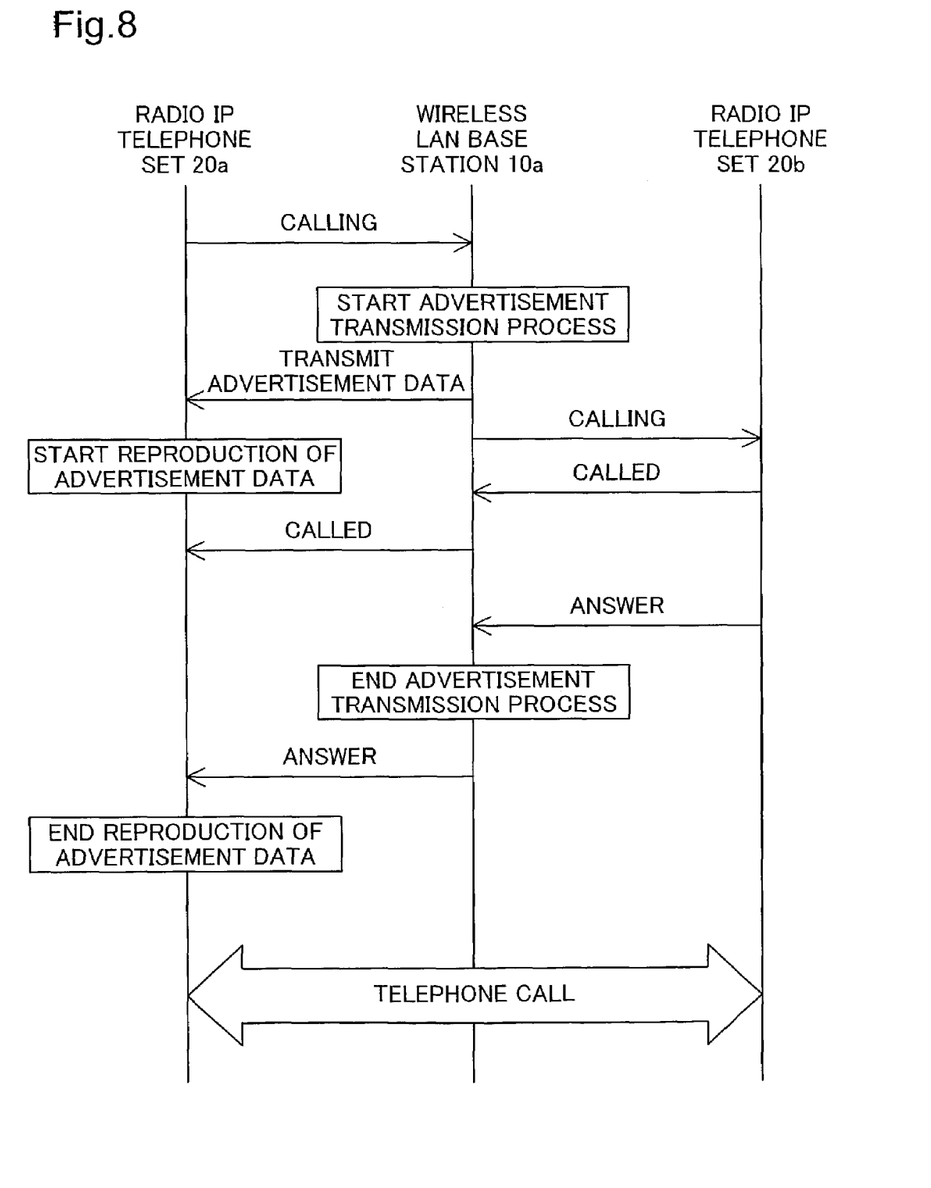
FIG. 8 shows a sequence of communication in the wireless IP telephony system.

In the process of a call from the radio IP telephone set 20*a* to the radio IP telephone set 20*b*, the wireless LAN base station 10*a* transmits the advertisement data to the radio IP telephone set 20*a* according to an advertisement transmission process discussed below. FIG. 7 is a flowchart showing the advertisement transmission process executed by the wireless LAN base station 10*a*. FIG. 8 shows a sequence of communication in the wireless IP telephony system. In this example, it is assumed that the user of the radio IP telephone set 20*a* makes a phone call to the radio IP telephone set 20*b*, while connection between the radio IP telephone set 20*a* and the radio IP telephone set 20*b* is established. In response to a calling signal from the radio IP telephone set 20*a* to the radio IP telephone set 20*b* (step S100), the wireless LAN base station 10*a* transmits the advertisement data, which has been stored in the announcement information storage module 150 according to the data storage process discussed above, to the radio IP telephone set 20*a* (step S110). The transmission of the advertisement data to the radio IP telephone set 20*a* continues (step S110) until the radio IP telephone set 20*a* receives a reply signal from the radio IP telephone set 20*b* (step S120). The advertisement transmission process is terminated when the radio IP telephone set 20*a* receives the reply signal (step S120). The advertisement transmission process is not activated unless there is a calling signal from the radio IP telephone set 20*a* (step S100).

According to the advertisement transmission process discussed above, the radio IP telephone set 20*a* continuously receives the advertisement data from the wireless LAN base station 10*a* for the time period between transmission of the calling signal and reception of the reply signal, and reproduces the received advertisement data by means of the speaker 270. The user who makes a call listens to the reproduced advertisement data until a person answers the phone.

The above description regards the case of making a phone call from the radio IP telephone set 20*a* to the radio IP telephone set 20*b*. In the case of making a phone call from the radio IP telephone set 20*b* to the radio IP telephone set 20*a,* the wireless LAN base station 10*b* carries out the above series of advertisement transmission process to the radio IP telephone set 20*b*. In the above description, the communication target of the radio IP telephone set 20*a* is the radio IP telephone set 20*b*. But the communication target may be any terminal communicable with the radio IP telephone set 20*a,* for example, the IP telephone set 90 or the subscriber telephone set 95.

The structure of the first embodiment discussed above ensures addition of the advertisement information in the process of a telephone call from the radio IP telephone set 20*a*. The wireless LAN base station 10*a* works to add the advertisement information. This arrangement thus allows addition of the advertisement information without any specific server on the Internet 30 between the wireless LAN base station 10*a* and the wireless LAN base station 10*b*. The advertisement fees are used to compensate for all or at least part of the expenses on the use of the radio IP telephone set.

The advertisement transmission process of this embodiment specifies the start of the transmission of advertisement data, based on the presence of the calling signal (step S100). One possible modification may specify the start of the transmission of advertisement data, based on the presence of the called signal. The advertisement information may be added to the terminal of the called side, instead of to the terminal of the calling side. This arrangement enables the advertisement information to be added to a greater number of available terminals.

Figure 9:
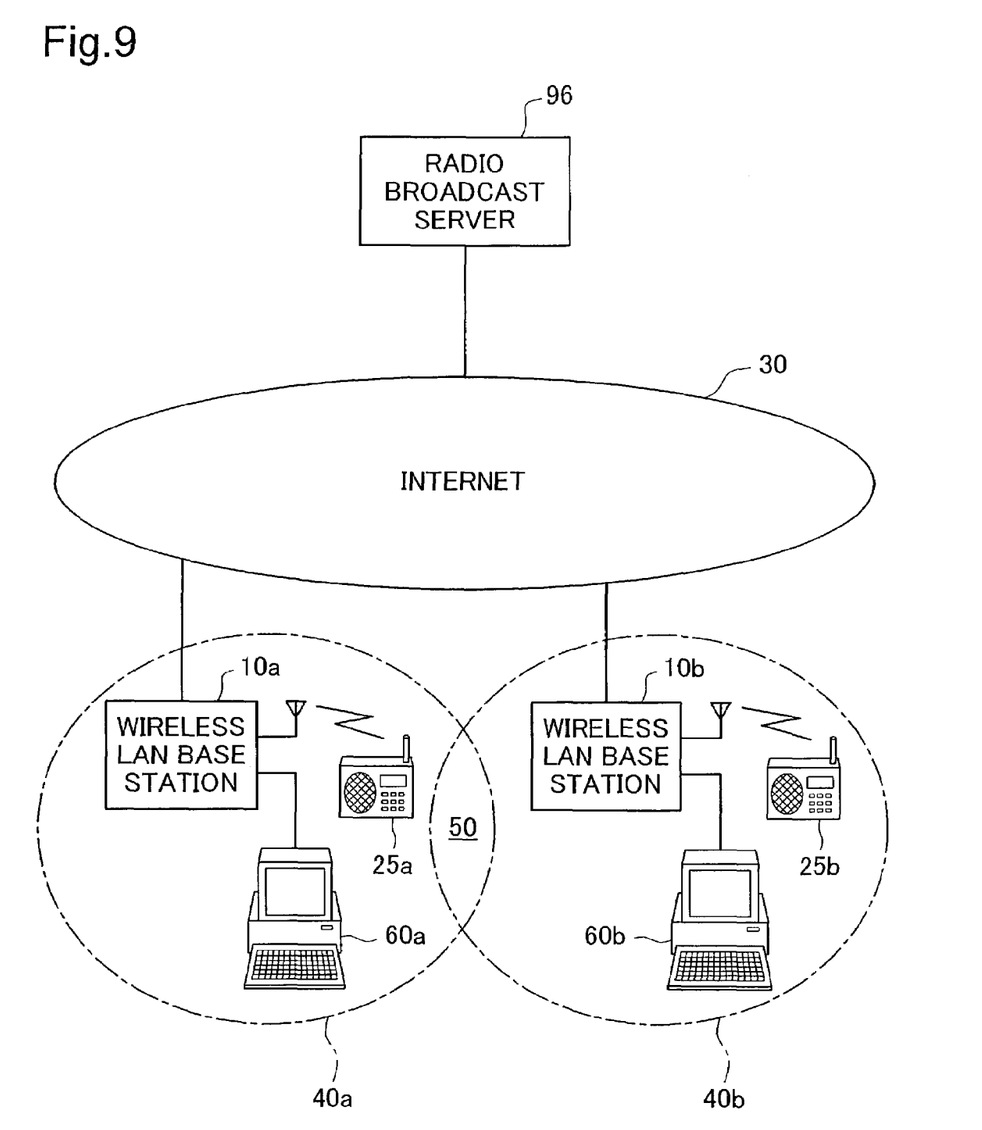
FIG. 9 schematically illustrates the general construction of an Internet radio system in a second embodiment of the present invention.

The following describes an Internet radio system utilizing a connection device for connection with a wireless LAN as a second embodiment of the present invention. FIG. 9 schematically illustrates the general construction of the Internet radio system in the second embodiment. The Internet radio system includes wireless LAN base stations 10*a* and 10*b,* management client computers 60*a* and 60*b,* radio receivers 25*a* and 25*b* as client computers of the wireless LAN base stations 10*a* and 10*b,* and a radio broadcast server 96 connecting with the Internet 30. The radio receivers 25*a* and 25*b* are Internet radio receivers that respectively receive audio data transmitted from the radio broadcast server 96 via the wireless LAN and the Internet 30 and reproduce the received audio data by a streaming function. The streaming function does not reproduce the audio data after reception of all the audio data, but reproduces the audio data while receiving the audio data. The wireless LAN base stations 10*a* and 10*b* are connected with radio receivers in respective radio zones 40*a* and 40*b,* in which radio waves are transmittable, via respective wireless LANs. The radio zones 40*a* and 40*b* have a mutual overlap area called a band switchover area 50, which functions to switch over the radio channel (band switchover) between the wireless LAN base stations 10*a* and 10*b*. This band switchover technique allows mobile communication of the radio receivers 25*a* and 25*b* between the radio zones 40*a* and 40*b*.

In the Internet radio system, the management client computer 60*a* or 60*b* stores the advertisement data as the announcement information into the announcement information storage module 150 of the wireless LAN base station 10*a* or 10*b,* according to the same series of storage process as discussed in the first embodiment. The advertisement data is audio information obtained by converting analog audio data into a form of digital data to allow transmission between digital devices, and is reproducible by the Internet radio receiver.

Figure 10:
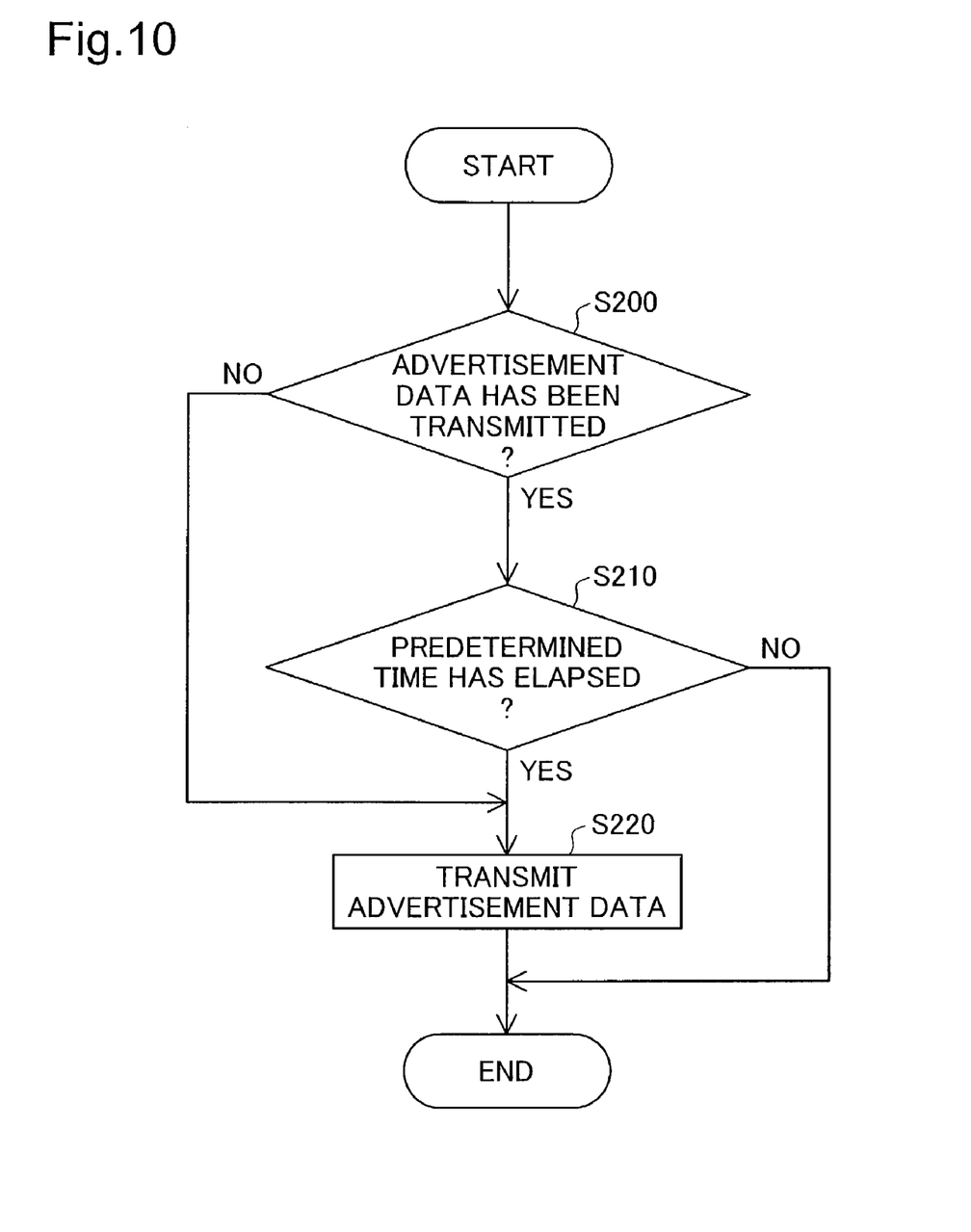

While the radio receiver 25*a* receives the audio data, the wireless LAN base station 10*a* transmits the advertisement data to the radio receiver 25*a* according to a radio advertisement transmission process discussed below. FIG. 10 is a flowchart showing the radio advertisement transmission process executed by the wireless LAN base station 10*a*. When the radio receiver 25*a* starts receiving the audio data from the wireless LAN base station 10*a,* no advertisement data has yet been transmitted (step S200). The wireless LAN base station 10*a* accordingly transmits the advertisement data, which has been stored in the announcement information storage module 150 according to the above data storage process, to the radio receiver 25*a* (step S220). The program then exits from this radio advertisement transmission routine. When the radio receiver 25*a* continues receiving the audio data, the advertisement data has already been transmitted (step S200). In the case where a preset time (for example, 15 minutes) has elapsed since the previous transmission of the advertisement data (step S210), the wireless LAN base station 10*a* again transmits the advertisement data to the radio receiver 25*a* (step S220). The program then exits from this radio advertisement transmission routine. In the case where the preset time has not yet elapsed since the previous transmission of the advertisement data (step S210), the program immediately exits from this radio advertisement transmission routine without any further processing.

According to the radio advertisement transmission process discussed above, the radio receiver 25a receives the advertisement data from the wireless LAN base station 10a at the time of starting the reception of the audio data and after elapse of a preset time from the previous transmission of the advertisement data in the course of the continuous reception of the audio data, and reproduces the received advertisement data. The above series of radio advertisement transmission process is also applied for transmission of the radio advertisement from the wireless LAN base station 10b to the radio receiver 25b.

The structure of the second embodiment discussed above ensures addition of the advertisement information when the radio receiver 25a receives the audio data. The wireless LAN base station 10a works to add the advertisement information. This arrangement thus allows addition of the advertisement information without any specific server on the Internet 30 between the wireless LAN base station 10a and the radio broadcast server 96. The advertisement fees are used to compensate for all or at least part of the expenses of radio broadcasting.

The above embodiments and their applications are to be considered in all aspects as illustrative and not restrictive. There may be many modifications, changes, and alterations without departing from the scope or spirit of the main characteristics of the present invention. For example, the connection target of the connection device is not restricted to the Internet 30 but may be another wide area network. Connection of the connection device with the client computer may be attained by a cabled LAN or another data communication means, instead of the wireless LAN. The timing of the transmission of advertisement is not restricted to the start of communication of the audio information, but may be the end of communication of audio information or in the middle of communication of audio information. Multiple connection devices may store different pieces of advertisement data. This arrangement allows addition of advertisement information suitable for each local area with the access point. The announcement information stored in and transmitted by the wireless LAN base station 10a is not restricted to the advertisement information but may be public information in a condominium, an apartment house, or another small-sized community, or guide information in some event.

The scope and spirit of the present invention are indicated by the appended claims, rather than by the foregoing description.

What is claimed is:

1. A connection device that provides an access point used for connecting a client computer with a wide area network, said connection device comprising:
    an announcement information storage module that stores audio information, which is reproducible by said client computer, as announcement information;
    an audio information communication mediation module that utilizes a protocol provided by the wide area network and mediates communication of audio information between said client computer and another device connected thereto via the wide area network; and
    a transmission module that transmits the announcement information stored in said announcement information storage module to said client computer at a preset timing in the process of mediating communication of the audio information between said client computer and the wide area network.

2. A connection device in accordance with claim 1, wherein said client computer is an IP telephone set that receives and transmits a packet of audio information to attain voice communication, and said audio information communication mediation module transmits the packet to said IP telephone set specified by the packet according to the protocol.

3. A connection device in accordance with claim 1, wherein said client computer is an Internet radio set that receives a packet of audio information and reproduces voice, and said audio information communication mediation module transmits the packet to said Internet radio set specified by the packet according to the protocol.

4. A connection device in accordance with claim 1, wherein the preset timing for the transmission module to transmit the stored announcement information is positioned at one selected from the group consisting of:
    at a start of the communication of the audio information;
    at an end of the communication of the audio information; and
    in the middle of the communication of the audio information.

5. A connection device in accordance with claim 1, said connection device further comprising a management client computer that updates the announcement information stored in said announcement information storage module.

6. A connection device in accordance with claim 1, said connection device further comprising a router module that links a local area network with the wide area network and connects said client computer to the wide area network via the local area network.

7. A connection device in accordance with claim 6, wherein said router module establishes connection of at least one of client computers included in the local area network via wireless communication.

8. A method of connecting a client computer with a wide area network via an access point, said method comprising the steps of:
    storing audio information, which is reproducible by said client computer, as announcement information in said access point;
    utilizing a protocol provided by the wide area network and mediating communication of audio information between said client computer and another device connected thereto via the wide area network; and
    transmitting the stored announcement information to said client computer at a preset timing in the process of mediating communication of the audio information between said client computer and the wide area network.

9. A connection device that provides an access point used for connecting a client computer that functions as an IP telephone set with a wide area network, wherein the IP telephone set is arranged to transmit and receive audio information packets to facilitate voice communications, said connection device comprising:
    an audio information communication mediation module that utilizes a protocol provided by the wide area network and mediates communication of audio information that constitutes a telephone call between said client computer and a second device connected to the client computer via the wide area network;
    an announcement information storage module that stores audio information that is not created by either the client computer or the second device, and which is reproducible in audio form by said client computer, as announcement information; and a transmission module that transmits the announcement information stored in said announcement information storage module to said client computer at a preset timing in the call.

10. The connection device in accordance with claim 9, wherein the audio information is one selected from the group consisting of advertisement information and public information.

* * * * *